April 18, 1933.     D. B. MARPLES     1,904,320
PIPELINE BOOSTER SYSTEM
Filed Oct. 5, 1931
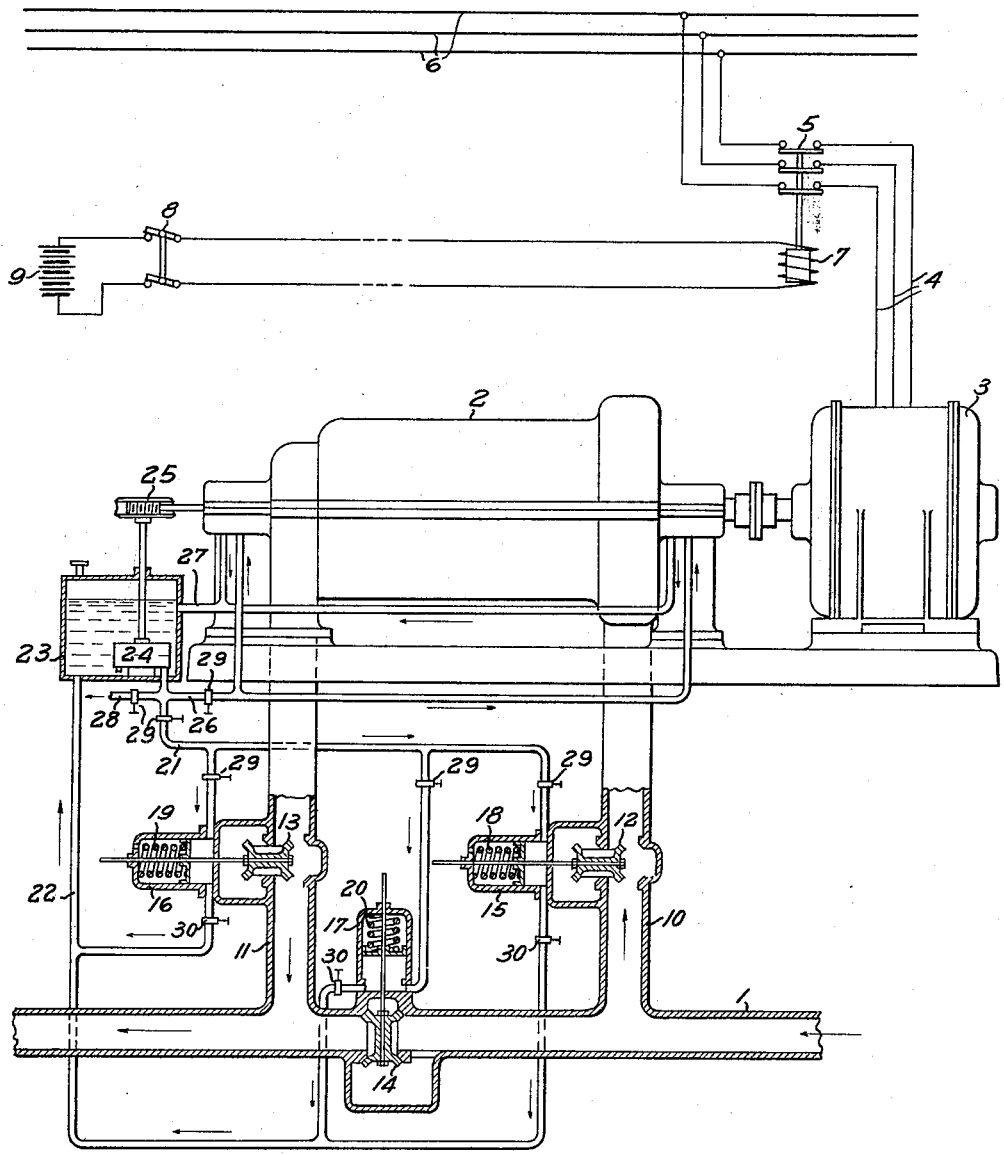
Inventor
D. B. Marples
by G. J. O'Brien
Attorney Patented Apr. 18, 1933

1,904,320

UNITED STATES PATENT OFFICE

DEREK B. MARPLES, OF BELLA VISTA, WETTINGEN, SWITZERLAND, ASSIGNOR TO ALLIS-CHALMERS MANUFACTURING COMPANY, OF MILWAUKEE, WISCONSIN, A CORPORATION OF DELAWARE

PIPELINE BOOSTER SYSTEM

Application filed October 5, 1931. Serial No. 567,061.

This invention relates generally to pipeline systems and more specifically to pumping systems applicable to pipelines and known as boosters, for raising the pressure of the fluid being transmitted through the pipelines.

The object of the invention is to provide a booster system for pipelines which will connect to or isolate from a pipeline a booster pump for increasing the pressure of the fluid in the pipeline. A more specific object is to do this automatically upon starting up the motor which drives the booster pump.

Transmission pipelines are used to convey fluid, either liquid or gas, and specifically either water or oil as liquids or natural gas or coal gas as gases, and are generally provided with booster pumps for increasing the pressure of the fluid as this pressure decreases due to friction in transit.

The present invention is particularly intended for use in a station that is unattended and which may be situated at a considerable distance from the point where attendants are stationed who attend to what little there is to be done in connection with the system the subject of this invention. Nevertheless, there is no reason why the present system may not be used in a station having attendants.

The system of the present invention may be either fully or semi-automatic. By fully automatic is meant a station controlled by a clock, a pressure regulator, a flow regulator or similar device. By semi-automatic is meant a station controlled by an attendant either locally or at a distance by the mere operation of actuating the starter of the motor driving the booster.

Booster machines of this kind when not running should be isolated from the transmission pipeline so as to avoid not only the additional pressure losses due to the fluid having to flow through the then stationary machine, but also the undesirable consequences of having a fluid flow through an inoperative machine, namely, unnecessary wear, possibility of throwing the rotating parts out of balance due to impurities settling asymmetrically on the rotating parts, and other objectionable conditions.

For an understanding of the invention reference is made to the specification hereinbelow and to the drawing accompanying same and forming a part thereof. The single figure is a diagrammatic representation of the system.

Referring to the drawing, a pipeline 1 is used for the purpose of transmitting the fluid in the direction indicated by the arrows. A booster pump 2 is indicated as a standard form of turbo-blower, and is rotatably connected to and driven by a prime mover indicated on the drawing as a motor 3. Motor 3 is connected by leads 4 through a switch 5 to a source of electrical energy, a power line 6. The switch 5 is operated by a solenoid 7, connected through switch 8 to a source of electrical energy, a battery 9.

The booster pump 2 is connected to pipeline 1 by means of inlet pipe 10 and discharge pipe 11. A valve 12 is located in inlet pipe 10 and a valve 13 is located in discharge pipe 11, while a third valve 14 is located in the pipeline 1 between the points of connection thereto by the inlet pipe 10 and discharge pipe 11. Servo-motors 15, 16, 17 are respectively connected to valves 12, 13, 14 in such a manner that when pressure is applied to the servo-motors 15, 16 controlling the valves 12, 13 respectively in the inlet and discharge pipes, these valves will be actuated to open position. On the other hand, servo-motor 17 is applied to actuate valve 14 in the pipeline so that when pressure is applied to this servo-motor it will actuate the valve to closed position. Springs 18, 19, 20 are applied to the pistons of the servo-motors 15, 16, 17 to operate reversely to the actuation by fluid pressure on the pistons, that is, springs 18, 19 operate to actuate the valves 12, 13 to closed position upon cessation of fluid pressure in their servo-motors, while spring 20 operates to actuate valve 14 to open position upon cessation of fluid pressure in servo-motor 17.

The servo-motors 15, 16, 17 are supplied from any convenient source of fluid pressure such as the oil under pressure supplied to the lubricating system of the booster by means of supply piping 21 and the oil discharged therefrom is carried away by discharge piping 22 back to the oil supply tank 23. The oil supply is put under pressure by an oil pump 24 preferably located in the oil supply tank 23 and connected by worm and wheel gearing 25 to the booster shaft. The oil under pressure from the oil pump 24 is therefore supplied to the servo-motors through supply piping 21, and to the lubricating system through supply piping 26 from which it returns through discharge piping 27 to the tank, and the oil pump 24 may also supply other auxiliaries through the supply piping 28. In the various piping are placed baffles, shown in the form of hand valves 29 placed in the supply piping at points where it branches into more than one path, and other baffles shown as hand valves 30 are placed in the discharge piping of the servo-motors or for that matter in the discharge piping from the lubricating system. The purpose of these baffles is to insure an adequate supply to any of the devices located in the more than one branch path to which the fluid pressure is designed to be sent.

The operation is as follows: Assuming that the booster system is not in operation an attendant local to or distant from the station will close switch 8. This will send current from battery 9 to solenoid 7 operating same to close switch 5. This will supply current from power line 6 to motor 3 setting same in motion to operate the rotor of booster pump 2 and setting oil pump 24 in operation at the same time. Oil pressure will immediately be supplied by oil pump 24 through supply piping 21 to the servo-motors 15, 16, 17 which will operate to open valves 12, 13 and close valve 14. At the same time lubricating fluid will be caused by oil pump 24 to be distributed through supply piping 26 to the lubricating system, and through supply piping 28 to auxiliaries.

The booster system is now in normal operation increasing the pressure in the pipeline from that received at the right of valve 14 to that discharged at the left thereof. As long as the booster pump 2 and the connected oil pump 24 are in operation the valves will be held in their proper positions for such operation and the pressure in the pipeline will be boosted as desired and the booster system will be properly supplied with lubricating fluid.

When it is desired not to have the pressure in the pipeline increased, the attendant will open switch 8 thereby causing deenergization of solenoid 7 so that gravity may operate switch 5 to open leads 4 supplying the motor 3 with current. The rotating parts will therefore come to rest and the oil pressure set up by oil pump 24 will subside to a value where the springs 18, 19, 20 will actuate valves 12, 13 to closed position and valve 14 to open position thus cutting off access from pipeline 1 to the booster pump 2 and opening up direct communication from the inlet part of the pipeline 1 to the discharge part of pipeline 1.

The systems described are particularly applicable to situations where centrifugal machines such as centrifugal pumps, turbo-blowers, etc., are connected to a transmission pipeline. These systems can be readily adapted so that such machines remain isolated from the system over the whole starting period, that is, by giving the oil pistons a certain amount of lost motion and also by suitably proportioning the baffles in the oil pipelines. Such isolation is of advantage inasmuch as it enables the starting torque to be kept as low as possible over the whole starting period.

It is obvious that the valve system is entirely self-contained and necessitates no intervention from an outside source by an attendant at the station and may be started or stopped from a point at a considerable distance from the station.

It should be understood that it is not desired to limit the invention to the exact details of construction shown and described, for various modifications may occur to persons skilled in the art.

It is claimed and desired to secure by Letters Patent:

1. In a booster system, the combination of a pipeline, a pump in said pipeline, a bypass around said pump and automatic valve means for closing off the pump inlet and discharge and for opening said bypass when said pump is stopped, and vice versa.

2. In a booster system, the combination of a pipeline, a pump in said pipeline, a bypass around said pump and valve means automatically operated by a condition set up on operation of the pump for closing off the pump inlet and discharge and for opening said bypass when said pump is stopped, and vice versa.

3. In a booster system, the combination of a pipeline, a pump in said pipeline, a bypass around said pump, a liquid pump rotatable with said pipeline pump and valve means operated by pressure developed by said liquid pump for closing off the pump inlet and discharge and for opening said bypass when said pump is stopped, and vice versa.

In testimony whereof, the signature of the inventor is affixed hereto.

DEREK B. MARPLES.